June 3, 1930.                    W. H. COBB                    1,761,385
                              FASTENING DEVICE
                            Filed July 24, 1926
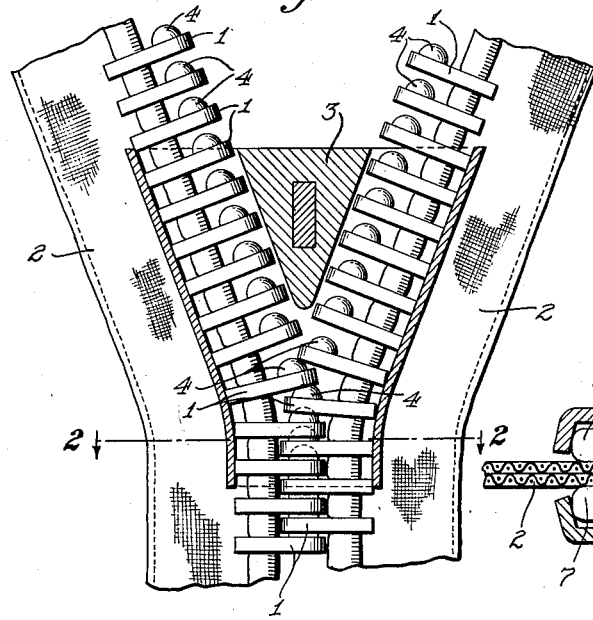
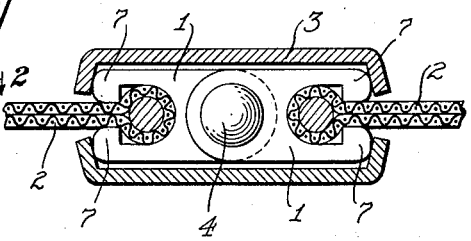
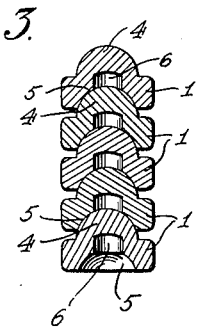
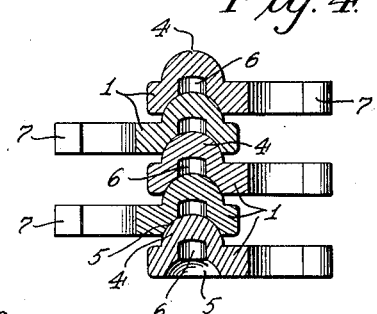
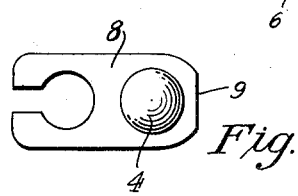
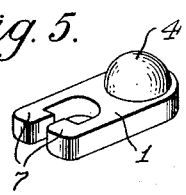
INVENTOR.
Willard H. Cobb
BY
Ernest Hopkinson
ATTORNEY.

UNITED STATES PATENT OFFICE

WILLARD H. COBB, OF BROOKLYN, NEW YORK, ASSIGNOR TO THE SHOE HARDWARE COMPANY, OF WATERBURY, CONNECTICUT, A CORPORATION OF CONNECTICUT

FASTENING DEVICE

Application filed July 24, 1926. Serial No. 124,564.

This invention relates to fastening devices, more particularly to a multiple fastener comprising series of elements engageable or disengageable by the operation of a slider.

It aims to provide a new and improved type of multiple fastener suitable for plackets, footwear and, in general, for closing openings in any flexible material, and to provide a fastener that is reliable, strong, simple, easily operated, and which can be cheaply manufactured from sheet metal. Other objects will appear from the detailed description.

The fastening device comprises, broadly, staggered series of elements adapted to be anchored at one end to flexible supports, while the cooperating free ends of the elements are each provided with a projection and socket on opposite surfaces, the projection and socket being formed on the same radius of curvature, but the surface of the socket subtending a smaller solid angle than the surface of the projection, the socket being provided with an auxiliary recess.

For a complete disclosure of the nature and objects of the invention reference is had to the accompanying drawings, in which latter—

Fig. 1 is a plan showing two series of the elements in partial engagement, the slider for engaging them being shown in section.

Fig. 2 is a transverse section on the line 2—2 of Fig. 1.

Fig. 3 is a longitudinal section of two series of nested elements.

Fig. 4 is a longitudinal section of the nested elements taken at right angles to the view in Fig. 3.

Fig. 5 is a perspective of a single element; and

Fig. 6 is a plan view of a slightly modified form of element.

Referring to the drawings, the numeral 1 designates one of the elements, two partially engaged series of which are shown in Fig. 1 as anchored to the flexible supporting strips 2, and in cooperative relation with the slider 3 for engaging or disengaging the elements. Each element 1 comprises a body which is provided on one surface adjacent its free end with a projection 4, this projection in the present instance being shown as spherically curved and substantially hemispherical. The opposite face of the element is provided with a socket or recess 5 also of general spherical contour and curved on the same radius as that of the projection 4, while at the bottom of the socket 5 is an auxiliary recess 6 extending up into the projection 4. In the preferred method of manufacture of the elements the socket 5 is first formed by a punch of proper spherical contour cooperating with an apertured die, which operation causes a projection to be formed on the opposite surface of the element, but which projection at this time is not of the coutour or height of the projection 4. In the next operation a punch is used, of the shape of the recess 6, while the complementary die is recessed in the exact form of the projection 4, which latter, as before stated, has the same radius of curvature as the socket. The element is then finished by forming the clinching or securing arms 7 at its other end. The recess 6 is technically known as a "borrow" recess, since the material formerly contained in it has been borrowed or transposed in order to properly fill out the recess in the die in which the projection 4 is formed. By reason of this construction the socket and projection have the same radius of curvature but the socket subtends a smaller solid angle than the projection, or, in other words, the socket extends into the material a less distance on the one side than the projection extends out of the material on the other side. The entire dieing operation may be performed in one or more steps, but as the formation of the borrow recess 6 simultaneously with the socket causes greater wear on the punches, the previously described method is preferred.

It will be seen from an inspection of Figs. 3 and 4 that when the elements are in cooperative relation the projection 4 of one element enters the socket 5 of the next element, and the surfaces of the socket and projection directly contact, but due to the fact that the surface of the socket subtends a smaller solid angle than the surface of the projection, the entire projection cannot enter the socket, hence the elements when in nested relation are spaced from each other by reason of the extension of the curved surface of the projection 4 outside of the socket 5. While in the present embodiment the projection 4 is shown as substantially hemispherical, that is, projecting above the surface of the element to a height about equal to its radius, it is obvious that this height, as well as the depth of the socket 5, may be varied, but in all cases the height will be sufficient to prevent direct contact of the bodies of the elements with each other when in nested relation, so that adjoining elements bear on each other only within the sockets. As the elements are all alike, they may be used interchangeably in either of the cooperating series forming the complete fastener. The flexible supporting strips 2 may be provided with corded, beaded or otherwise thickened edges over which the securing arms 7 of the elements may be clinched, but it is obvious that any other suitable forms of support and fastening for the elements may be used. By provision of the recess 6 the friction between elements is reduced since the contacting surface of the socket is less than the effective contacting surface of the projection.

Among advantages of the construction are, that the projections and sockets may be made quite small with a short radius of curvature; also the flexibility of the fastener as a whole is increased; and when engaging the elements the projection on one element acts to cam the adjacent staggered element into position for nesting.

In the modification shown in Fig. 6 the element 8 is in general similar to the element 1 and is provided with a projection 4 and socket 5 similar to the previously described form, but the face of the free end of the element instead of being curved at all points as shown in Fig. 5 is provided with a flattened front portion 9. When the elements are engaged, this flat portion 9 is substantially in contact with the edge of the opposite supporting strip 2 and prevents pivotal or toggle movement of the engaged ends of the elements out of parallel alignment, thereby insuring against accidental disengagement of the elements.

It will be seen that by the invention a multiple fastener has been provided which is simple, strong, easily operated, is very flexible and practically frictionless, and which can be cheaply manufactured from sheet metal by the method described.

While specific embodiments of the invention have been shown and described it is obvious that changes can be made therein without departing from the spirit of the invention, and it is not desired to limit the latter except as is set forth in the appended claims.

Having thus described my invention, what I claim and desire to protect by Letters Patent is:

1. A multiple fastening device of the type having a series of like elements in secured and separated relation in opposite sides of an opening, those of one series being staggered with respect to those of the other series, the interengageable fastening elements being provided with anchoring portions and free locking portions, said locking portions being provided with approximately hemispherical projections extending from one surface of the elements and with sockets in the opposite surface of the elements, said projections extending from the surface of the elements a greater distance than they enter into the sockets of the next adjacent member, whereby the body portions of the elements are secured and maintained in separated relation when the elements are nested, said sockets being each provided with an auxiliary recess to reduce the engageable area of the surface of the recess and to provide sufficient metal for the formation of the projection.

2. A multiple fastening device comprising series of like coacting staggered elements operable by a slider, said elements being provided with anchoring devices adjacent their ends and interengageable projections and sockets adjacent the opposite ends, the surfaces of the projections and sockets being curved on the same radius, but the surface of the sockets subtending a lesser solid angle than that of the projections, and a countersunk recess in each of said sockets to reduce the engageable area of the surface of the recess and to provide sufficient metal for the formation of the projection.

3. In a fastening device of the class described, the combination of a fastener element comprising an elongated plate like member with attaching means at one end and having a projection and a recess at the other end and at opposite sides respectively thereof, said recess being formed with an annular bearing portion corresponding to the form of the projection and having a depressed center for enlarging the projection.

4. In a fastening device of the class described, the combination of opposed series of fastener elements and a slider operable therealong for interlocking and releasing same, each of said elements having a projection and a recess at its outer end to engage respectively with a recess and projection of adjacent elements of the opposed series, said recess being provided with means against which the projection seats to maintain a space between the top of the projection and the bottom of the recess.

5. In a fastening device of the class described the combination of opposed series of fastener elements and a slider operable therealong for interlocking and releasing same, each of said elements having a projection and a recess at the outer end to engage respectively with a recess and a projection of adjacent elements of the opposed series, said recess having a seat conforming to and engaged by the projection, and said recess being extended beyond the projection when the latter is engaged in the seat.

6. A fastener having interengageable elements, a projection on each interengageable element and a recess on the opposite side of each element from the projection, said recess having a borrow recess therein to provide for enlarging the projection, the projections and recesses of the interengageable elements being arranged and shaped to interfit.

7. A fastener having interengageable elements, each element having a projection and recess arranged in register on opposite sides of the element, said recess having a hollowed out portion to provide material for enlarging the projection, the projections and recesses of the interengageable elements being shaped to interfit.

Signed at New York, in the county of New York and State of New York, this 21st day of July, 1926.

WILLARD H. COBB.